US009811780B1

(12) United States Patent
Aradhye et al.

(10) Patent No.: US 9,811,780 B1
(45) Date of Patent: Nov. 7, 2017

(54) IDENTIFYING SUBJECTIVE ATTRIBUTES BY ANALYSIS OF CURATION SIGNALS (71) Applicants: Hrishikesh Aradhye, Santa Clara, CA (US); Sanketh Shetty, Sunnyvale, CA (US)

(72) Inventors: Hrishikesh Aradhye, Santa Clara, CA (US); Sanketh Shetty, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 378 days.

(21) Appl. No.: 13/842,896

(22) Filed: Mar. 15, 2013

Related U.S. Application Data (60) Provisional application No. 61/694,203, filed on Aug. 28, 2012.

(51) Int. Cl.
G06N 99/00 (2010.01)
G06F 17/30 (2006.01)

(52) U.S. Cl.
CPC ....... *G06N 99/005* (2013.01); *G06F 17/3053* (2013.01)

(58) Field of Classification Search
CPC .................................................. G06N 99/005
See application file for complete search history.

(56) References Cited

U.S. PATENT DOCUMENTS

2014/0129942 A1* 5/2014 Rathod ............ H04N 21/44222
715/720

OTHER PUBLICATIONS

B. Pang et al., "Thumbs up? Sentiment Classification using Machine Learning Techniques", Assoc. Comp. Linguistics Proc. Conf. on Empirical Methods in Nat. Lang. Proc., Jul. 2002, pp. 79-86.*
S. Siersdorfer, "How Useful are Your Comments? Analyzing and Predicting YouTube Comments and Comment Ratings", Proc. ACM WWW 2010, pp. 891-900.*
Z. Xu et al., "Towards the Semantic Web: Collaborative Tag Suggestions", ACM WWW 2006, 8 pages.*
J. Wang et al., "Probabilistic relevance ranking for collaborative filtering", Inf. Retrieval, vol. 11, 2008, pp. 477-497.*
K. Lin et al "Emotion Classification of Online News Articles from the Reader's Perspective", IEEE/WIC/ACM Int'l Conf. on Web Intelligence and Intelligent Agent Tech., 2008, pp. 220-226.*

(Continued)

Primary Examiner — Vincent Gonzales
(74) Attorney, Agent, or Firm — Lowenstein Sandler LLP (57) ABSTRACT A system and method for identifying and predicting subjective attributes for entities (e.g., media clips, images, newspaper articles, blog entries, persons, organizations, commercial businesses, etc.) are disclosed. In one aspect, a first set of subjective attributes for a first entity is identified based on a reaction to the first entity. A classifier is trained on a set of input-output mappings, wherein the set of input-output mappings comprises an input-output mapping whose input is based on a feature vector for the first entity and whose output is based on the first set of subjective attributes. A feature vector for a second entity is then provided to the trained classifier to obtain a second set of subjective attributes for the second entity.

17 Claims, 7 Drawing Sheets (56) References Cited

OTHER PUBLICATIONS

C. Burges, "A Tutorial on Support Vector Machines for Pattern Recognition", Data Mining and Knowl. Discovery, 2, 1998, pp. 121-167.*
I. Arapkis et al., "Integrating Facial Expressions Into User Profiling for the Improvement of a Multimodal Recommender System", IEEE ICME 2009, pp. 1440-1443.*
F. Maillet et al., "Steerable Playlist Generation by Learning Similarity form Radio Station Playlists", 10th Int'l Soc. for Music Info. Retrieval Conf. 2009, pp. 345-350.*
S. Golder and B. Huberman, "The Structure of Collaborative Tagging Systems", J. Info. Sci., vol. 32, No. 2, 2006, 8 pages.*
J. Donaldson, "A Hybrid Social-Acoustic Recommendation System for Popular Music", ACM 1st Conf. on Rec. Sys., 2007, pp. 187-190.*
C. Yang et al., "Emotion Classification Using Web Blog Corpora", IEEE/WIC/ACM Int'l Conf. on Web Intell., 2007, pp. 275-278.*

\* cited by examiner

IDENTIFYING SUBJECTIVE ATTRIBUTES BY ANALYSIS OF CURATION SIGNALS

RELATED APPLICATIONS

This patent application claims the benefit under 35 U.S.C. §119(e) of U.S. Provisional Application No. 61/694,203, filed Aug. 28, 2012.

TECHNICAL FIELD

Aspects and implementations of the present disclosure relate to data processing, and more specifically, to identifying subjective attributes of entities.

BACKGROUND

User-generated content is becoming pervasive on the World Wide Web due to the increasing popularity of social networks, blogs, review websites, etc. Such content is often in the form of comments (e.g., a comment by a first user pertaining to content shared by a second user within a social network, a user comment in response to an article in a columnist's blog, a user comment pertaining to a video clip posted on a content hosting website, etc.), user reviews (e.g., of products, movies, etc.), user actions (e.g., Like!, Dislike!, +1, sharing, bookmarking, playlisting, etc.), and so forth.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a method for identifying and predicting subjective attributes for entities (e.g., media clips, images, newspaper articles, blog entries, persons, organizations, commercial businesses, etc.) is provided. The method includes identifying a first set of subjective attributes for a first entity based on a reaction to the first entity (e.g., comments on a website, a demonstration of approval of the first entity (e.g., "Like!, etc.), sharing the first entity, bookmarking the first entity, adding the first entity to a playlist, etc.). The method may then include training a classifier (e.g., a support vector machine [SVM], AdaBoost, a neural network, a decision tree, etc.) on a set of input-output mappings, where the set of input-output mappings comprises an input-output mapping whose input is based on a feature vector for the first entity and whose output is based on the first set of subjective attributes. A feature vector for a second entity may then be provided to the trained classifier to obtain a second set of subjective attributes for the second entity.

In some implementations, an apparatus comprising a memory and a processor is provided to identify and predict subjective attributes for entities. In other implementations, a computer readable storage medium is provided that has instructions that cause a computer system to perform operations including: identifying a first set of subjective attributes for a first entity based on a reaction to the first entity; obtaining a first feature vector for the first entity; training a classifier on a set of input-output mappings, wherein the set of input-output mappings comprises an input-output mapping whose input is based on the first feature vector and whose output is based on the first set of subjective attributes; obtaining a second feature vector for a second entity; and providing to the classifier, after the training, the second feature vector to obtain a second set of subjective attributes for the second entity.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

A system and method are disclosed for identifying and predicting subjective attributes for entities (e.g., media clips, images, newspaper articles, blog entries, persons, organizations, commercial businesses, etc.). In one implementation, a vocabulary of subjective attributes (e.g., "cute," "funny," "awesome," etc.) is defined, and subjective attributes for a particular entity are identified based on user reaction to the entity (e.g., comments on a website, Like!, sharing the first entity with other users, bookmarking the first entity, adding the first entity to a playlist, etc.). In one implementation, relevancy scores for each of the subjective attributes are determined with respect to the entity; for example, if the subjective attribute "cute" appears in a significant proportion of comments for a video clip, then "cute" may be assigned a high relevancy score. The entity is then associated with the identified subjective attributes and relevancy scores (e.g., via tags applied to the entity, via entries in a table of a relational database, etc.).

In one implementation, the above procedure is performed for each entity in a given set of entities (e.g., video clips in a video clip repository, etc.), and an inverse mapping from subjective attributes to entities in the set is generated based on the subjective attributes and relevancy scores. The inverse mapping can then be used to efficiently identify all entities in the set that match a given subjective attribute (e.g., all entities that have been associated with the subjective attribute "funny", etc.), thereby enabling rapid retrieval of relevant entities for processing keyword searches, populating playlists, delivering advertisements, generating training sets for the classifier, and so forth.

In one implementation, a classifier (e.g., a support vector machines [SVM], AdaBoost, a neural network, a decision tree, etc.) is trained by providing a set of training examples, where the input for a training example comprises a feature vector obtained from a particular entity (e.g., a feature vector for a video clip may contain numerical values pertaining to color, texture, intensity, metadata tags associated with the video clip, etc.) and the output comprises relevancy scores for each subjective attribute in the vocabulary for the particular entity. The trained classifier can then be used to predict subjective attributes for entities not in the training set (e.g., a newly-uploaded video clip, a news article that has not yet received any comments, etc.).

Aspects and implementations of the present disclosure are thus capable of intelligently classifying entities in an automated fashion according to subjective attributes such as "funny", "cute", etc. based on user reaction to the entities. Aspects and implementations of the present disclosure can thus improve the quality of entity descriptions (e.g., tags for a video clip, etc.), which in turn can improve the quality of searches and the targeting of advertisements.

Figure 1:
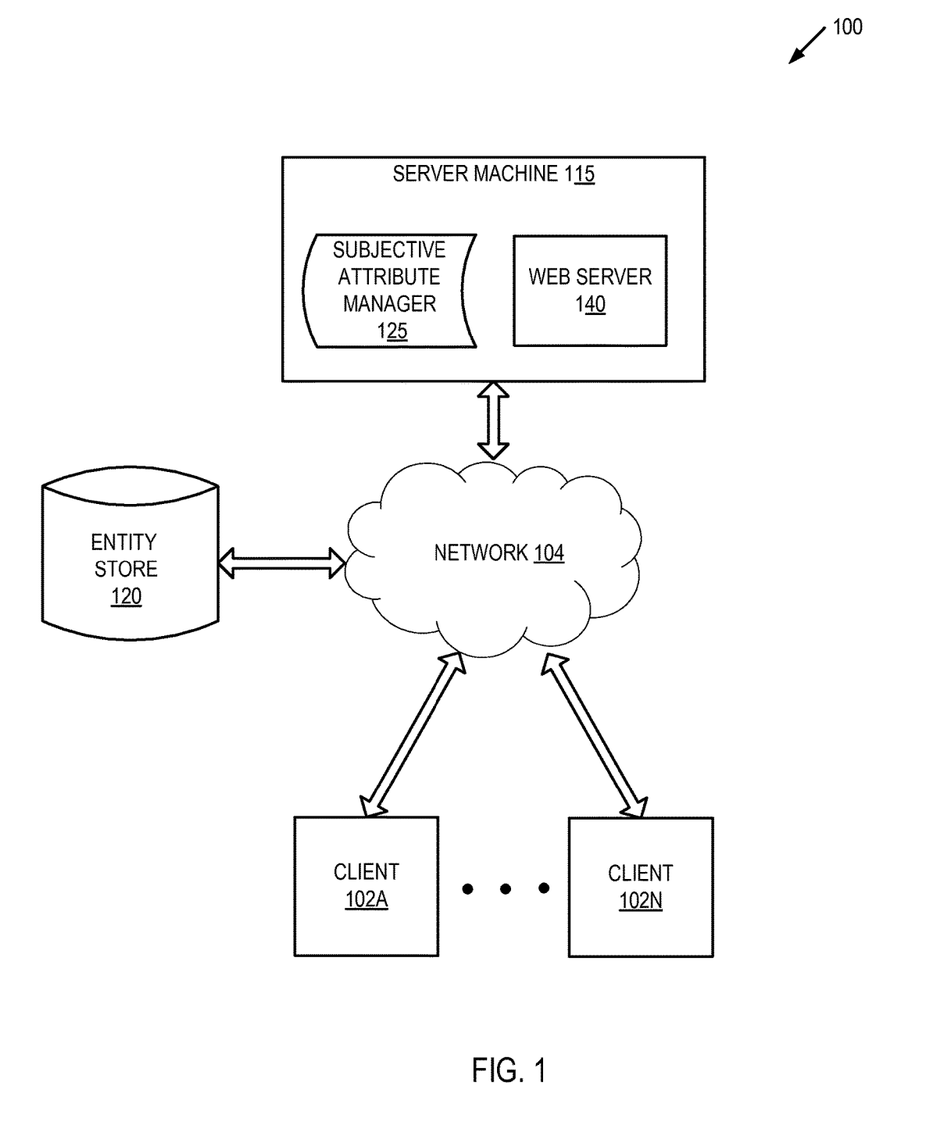
FIG. 1 illustrates an exemplary system architecture, in accordance with one implementation of the present disclosure.

FIG. 1 illustrates an example system architecture 100, in accordance with one implementation of the present disclosure. The system architecture 100 includes a server machine 115, an entity store 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be wireless terminals (e.g., smartphones, etc.), personal computers (PC), laptops, tablet computers, or any other computing or communication devices. The client machines 102A-102N may run an operating system (OS) that manages hardware and software of the client machines 102A-102N. A browser (not shown) may run on the client machines (e.g., on the OS of the client machines). The browser may be a web browser that can access web pages and content served by a web server. The client machines 102A-102N may also upload web pages, media clips, blog entries, links to articles, and so forth.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a subjective attribute manager 125. In alternative implementations, the web server 140 and subjective attribute manager 125 may run on different machines.

Entity store 120 is a persistent storage that is capable of storing entities such as media clips (e.g., video clips, audio clips, clips containing both video and audio, images, etc.) and other types of content items (e.g., webpages, text-based documents, restaurant reviews, movie reviews, etc.), as well as data structures to tag, organize, and index the entities. Entity store 120 may be hosted by one or more storage devices, such as main memory, magnetic or optical storage based disks, tapes or hard drives, NAS, SAN, and so forth. In some implementations, entity store 120 might be hosted by a network-attached file server, while in other implementations entity store 120 may be hosted by some other type of persistent storage such as that of the server machine 115 or one or more different machines coupled to the server machine 115 via the network 104. The entities stored in the entity store 120 may include user-generated content that is uploaded by client machines and may additionally or alternatively include content provided by service providers such as news organizations, publishers, libraries and so on.

Web server 140 may serve web pages and content from entity store 120 to clients 102A-102N. In accordance with some implementations, subjective attribute manager 125 identifies subjective attributes for entities based on user reaction (e.g., comments, Like!, sharing, bookmarking, playlisting, etc.), determines relevancy scores for subjective attributes with respect to entities, associates subjective attributes and relevancy scores with entities, extracts features (e.g., image features such as color, texture, and intensity; audio features such as amplitude, spectral coefficient ratios; textual features such as word frequencies, average sentence length, formatting parameters; metadata associated with the entity; etc.) from entities to generate feature vectors, trains a classifier based on the feature vectors and the subjective attributes' relevancy scores, and uses the trained classifier to predict subjective attributes for new entities based on feature vectors of the new entities. An implementation of subjective attribute manager 125 is described in detail below with respect to FIGS. 2 through 6.

Figure 2:
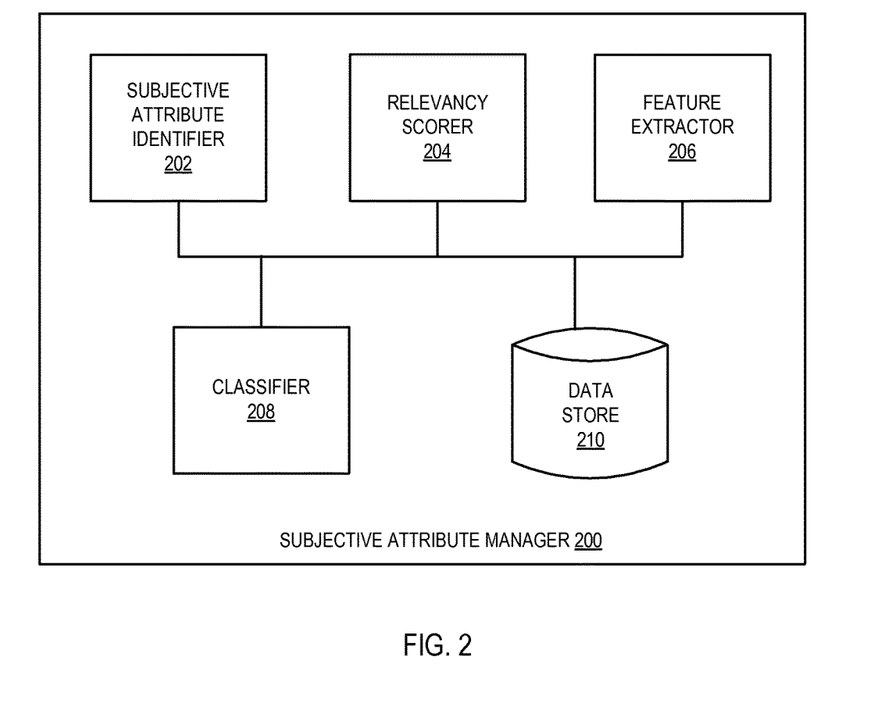
FIG. 2 is a block diagram of one implementation of a subjective attribute manager.

FIG. 2 is a block diagram of one implementation of a subjective attribute manager 200. The subjective attribute manager 200 may be the same as the subjective attribute manager 125 of FIG. 1 and may include a subjective attribute identifier 202, a relevancy scorer 204, a feature extractor 206, a classifier 208, and a data store 210. The components can be combined together or separated in further components, according to a particular implementation.

The data store 210 may be the same as entity store 120 or a different data store (e.g., a temporary buffer or a permanent data store) to hold a subjective attribute vocabulary, entities that are to be processed, feature vectors associated with entities, subjective attributes and relevancy scores associated with entities, or some combination of these data. Data store 210 may be hosted by one or more storage devices, such as main memory, magnetic or optical storage based disks, tapes or hard drives, and so forth. In one aspect, the subjective attribute manager 200 notifies users of the types of information that are stored in the data store 210 and/or entity store 120, and provides the users the opportunity to choose not to have such information collected and/or shared with the subjective attribute manager 200.

The subjective attribute identifier 202 identifies subjective attributes for entities based on user reaction to the entities. For example, in some implementations, subjective attribute identifier 202 may identify subjective attributes via text processing of users' comments to an entity that is posted by a user on a social networking website. Similarly, subjective attribute identifier 202 may identify subjective attributes for entities based on other types of user reactions to entities, such as 'Like!' or 'Dislike!', sharing the entity, bookmarking the entity, adding the entity to a playlist, and so forth. In some implementations, subjective attribute identifier 202 may apply one or more thresholds in determining which subjective attributes are associated with an entity (e.g., a subjective attribute should appear in at least N comments, etc.). Some operations of subjective attribute identifier 202 are described in more detail below with respect to FIG. 4.

The relevancy scorer 204 determines relevancy scores for subjective attributes with respect to entities. For example, in some implementations, when subjective attribute identifier 202 has identified the subjective attributes "cute", "funny", and "awesome" based on comments to a media clip posted on a social networking website, relevancy scorer 204 may determine relevancy scores for each of these three subjective attributes based on the frequency with which these subjective attributes appear in comments, the particular users that provided the subjective attributes, and so forth. For example, if there are 40 comments and "cute" appears in 20 comments and "awesome" appears in 8 comments, then "cute" may be assigned a relevancy score that is higher than "awesome". In some implementations, the relevancy scores may be assigned based on the proportion of comments that a subjective attribute appears in (e.g., a score of 0.5 for "cute" and a score of 0.2 for "awesome", etc.).

In some aspects, the relevancy scorer 204 may retain only the k most relevant subjective attributes and discard other subjective attributes. For example, if subjective attribute identifier 202 identifies seven subjective attributes that appear in user comments at least three times, then relevancy scorer 204 may, for example, retain only the five subjective attributes with the highest relevancy scores and discard the other two subjective attributes (e.g., by setting their relevancy scores to zero, etc.). In accordance with one implementation, the relevancy score is real number between 0.0 and 1.0 inclusive. Some operations of relevancy scorer 204 are described in more detail below with respect to FIG. 4.

The feature extractor 206 obtains a feature vector for an entity using one or more techniques such as principal components analysis, semidefinite embeddings, Isomaps, partial least squares, and so forth. In some aspects, the computations associated with extracting features of an entity are performed by feature extractor 302 itself, while in some other aspects these computations are performed by another entity (e.g., an executable library of image processing routines hosted by server machine 115 [not depicted in the Figures], an executable library of audio processing routines, an executable library of text processing routines, etc.) and the results are provided to feature extractor 206. Some operations of feature extractor 206 are described in more detail below with respect to FIGS. 4 through 6.

Classifier 208 is a learning machine (e.g., support vector machines [SVMs], AdaBoost, neural networks, decision trees, etc.) that accepts as input a feature vector associated with an entity, and outputs relevancy scores (e.g., a real number between 0 and 1 inclusive, etc.) for each subjective attribute of the subjective attribute vocabulary. In some implementations, classifier 208 consists of a single classifier, while in some other implementations, classifier 208 may include multiple classifiers (e.g., a classifier for each subjective attribute in the subjective attribute vocabulary, etc.).

In some implementations, a set of positive examples and a set of negative examples are assembled for each subjective attribute in the subjective attribute vocabulary. The set of positive examples for a subjective attribute may include feature vectors for entities that have been associated with that particular subjective attribute. The set of negative examples for a subjective attribute may include feature vectors for entities that have not been associated with that particular subjective attribute. In some implementations, when the set of positive examples and the set of negative examples are unequal in size, the larger set may be randomly sampled to match the size of the smaller set.

After training, classifier 208 may predict subjective attributes for other entities not in the training set by providing feature vectors for these entities as input to the classifier. In some implementations, a set of subjective attributes may be obtained from the output of classifier 208 by including all subjective attributes with non-zero relevancy scores, while in some other implementations, a set of subjective attributes may be obtained by applying a minimum threshold to the numerical scores (e.g., by considering all subjective attributes that have a score of at least, say, 0.2, as being a member of the set). Some operations of classifier 208 are described in more detail below with respect to FIGS. 4 through 6.

Figure 3:
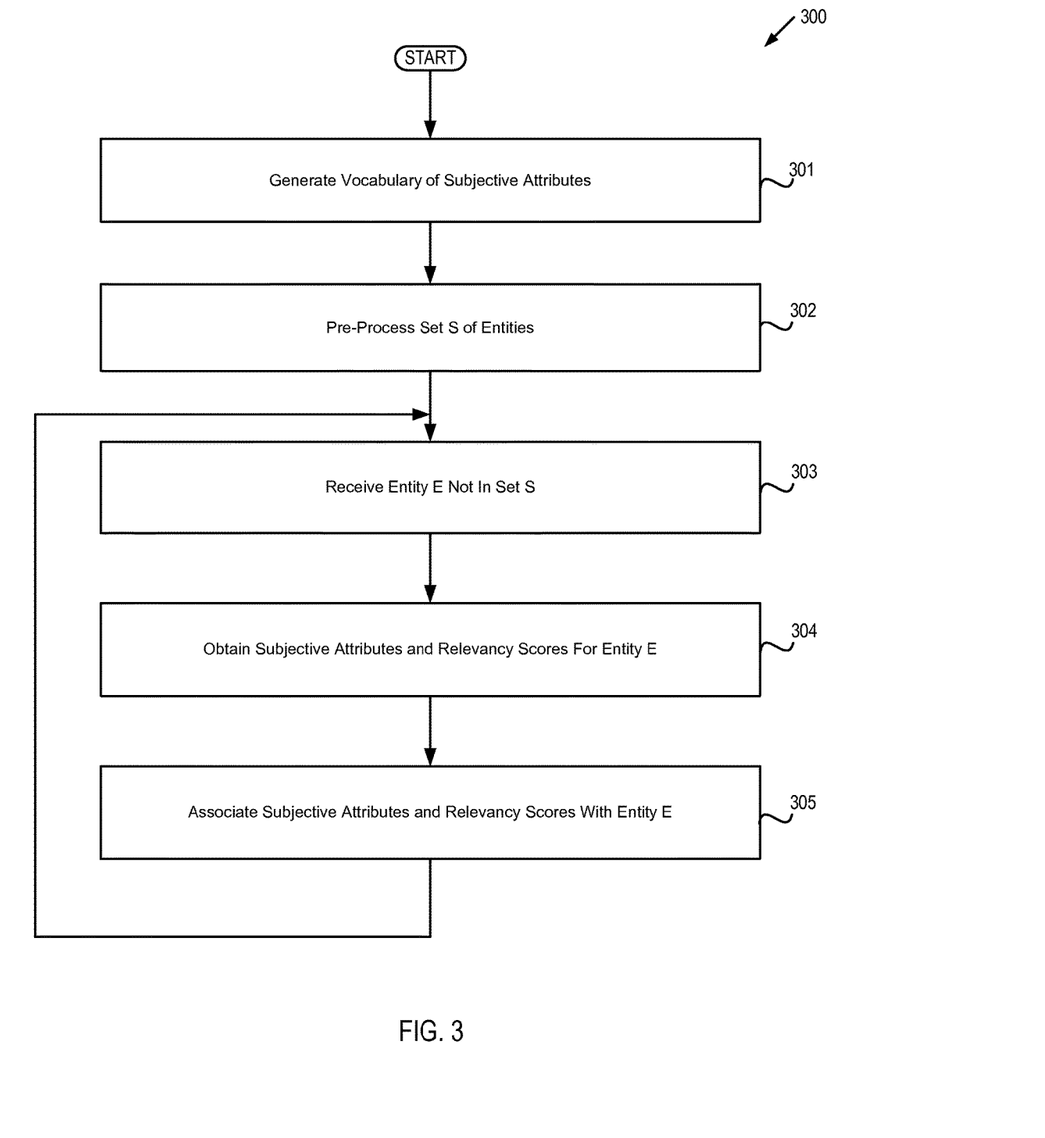
FIG. 3 depicts a flow diagram of an example of a method for identifying subjective attributes of entities, in accordance with some implementations of the present disclosure.

FIG. 3 depicts a flow diagram of an example of a method 300 for identifying subjective attributes of entities, in accordance with some implementations of the present disclosure. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more of blocks 301 through 305 may be performed by another machine. It should be noted that in some implementations, various components of subjective attribute manager 200 may run on separate machines (e.g., subjective attribute identifier 202 and relevancy scorer 204 may run on one machine while feature extractor 206 and classifier 208 run on another machine, etc.).

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 301, a vocabulary of subjective attributes is generated. In some aspects, the subjective attribute vocabulary may be defined manually, while in some other aspects, the subjective attribute vocabulary may be generated in an automated fashion by collecting terms and phrases that are used in users' reactions to entities, while in yet other aspects, the vocabulary may be generated by a combination of manual and automated techniques. For example, in one implementation the vocabulary is initially seeded manually with a small number of subjective attributes expected to apply to entities, and subsequently the vocabulary is expanded over time as additional terms or phrases that appear frequently in user reactions are identified via automated processing of the reactions. In some implementations, the subjective attribute vocabulary may be organized in a hierarchical manner, possibly based on "meta-attributes" associated with the subjective attributes (e.g., the subjective attribute "funny" may have a meta-attribute "positive", while the subjective attribute "disgusting" may have a meta-attribute "negative", etc.).

At block 302, a set S of entities (e.g., all of the entities in entity store 120, a subset of entities in entity store 120, etc.) is pre-processed. In accordance with one aspect, pre-processing of the set of entities comprises identifying user reactions to the entities, and then training a classifier based on the reactions. It should be noted that when an entity is an actual physical entity (e.g., a person, a restaurant, etc.), the pre-processing of the entity is performed via a "cyberproxy"

associated with the physical entity (e.g., a fan page for an actor on a social networking website, a restaurant review on a website, etc.); however, the subjective attributes are considered to be associated with the entity itself (e.g., the actor or restaurant, not the actor's fan page or the restaurant review). An example of a method for performing block 302 is described in detail below with respect to FIG. 4.

At block 303, an entity E that is not in set S is received (e.g., a newly-uploaded video clip, a news article that has not yet received any comments, an entity in entity store 120 that was not included in the training set, etc.). At block 304, subject attributes and relevancy scores for entity E are obtained. An implementation of a first example method for performing block 304 is described in detail below with respect to FIG. 5, and an implementation of a second example method for performing block 304 is described in detail below with respect to FIG. 6.

At block 305, the subjective attributes and relevancy scores obtained at block 304 are associated with entity E (e.g., by applying corresponding tags to the entity, by adding a record in a table of a relational database, etc.). After block 305, execution continues back at block 303. It should be noted that in some implementations, the classifier may be re-trained periodically (e.g., after every 100 iterations of the loop of FIG. 3, every N days, etc.) by a re-training process that may execute concurrently with the method of FIG. 3.

Figure 4:
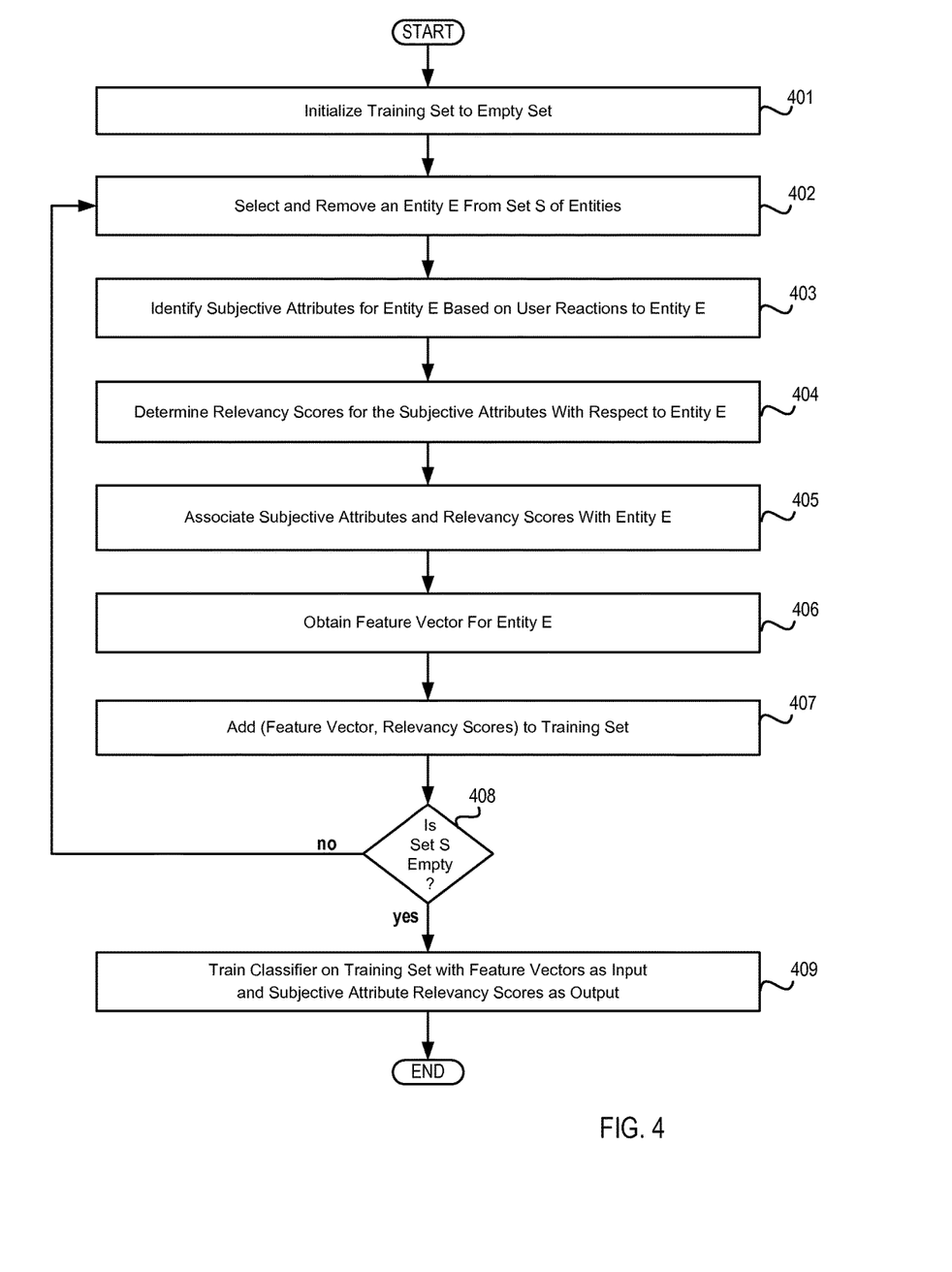
FIG. 4 depicts a flow diagram of an example of a method for pre-processing a set of entities, in accordance with some implementations of the present disclosure.

FIG. 4 depicts a flow diagram of an example of a method for pre-processing a set of entities, in accordance with some implementations of the present disclosure. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more of blocks 401 through 409 may be performed by another machine.

At block 401, the training set is initialized to the empty set. At block 402, an entity E is selected and removed from the set S of entities.

At block 403, subjective attributes for entity E are identified based on user reactions to entity E (e.g., user comments, Like!, bookmarking, sharing, adding to a playlist, etc.). In one implementation, the identification of subjective attributes includes performing processing of user comments (e.g., by matching words in user comments against subjective attributes in the vocabulary, by a combination of word matching and other natural language processing techniques such as syntactic and/or semantic analysis, etc.).

In some implementations, user reactions may be aggregated for entities that occur in multiple locations (e.g., entities that appear in multiple users' playlists, entities that have been shared and appear in a plurality of users' "newsfeeds" on a social networking website, etc.). The different locations may be weighted in their contribution to relevancy scores based on a variety of factors, such as a particular user associated with the location (e.g., a particular user may be an authority on classical music and therefore comments about an entity in his or her newsfeed may be weighted more highly than comments in another newsfeed, etc.), non-textual user reactions (e.g., "Like!", "Dislike!", "+1", etc.). In addition, the number of locations where the entity appears may also be used in determining subjective attributes and relevancy scores (e.g., relevancy scores for a video clip may be increased when the video clip is in hundreds of user playlists, etc.). In accordance with one implementation, block 403 is performed by subjective attribute identifier 202.

At block 404, relevancy scores for the subjective attributes are determined with respect to entity E. In one implementation, a relevancy score is determined for a particular subjective attribute based on the frequency with which the subjective attribute appears in user comments, the particular users that provided the subjective attributes in their comments (e.g., some users may be known from past experience to be more accurate in their comments than other users, etc.). For example, if there are 40 comments and "cute" appears in 20 comments and "awesome" appears in 8 comments, then "cute" may be assigned a relevancy score that is higher than "awesome." In some implementations, the relevancy scores may be assigned based on the proportion of comments in which a subjective attribute appears (e.g., a score of 0.5 for "cute" and a score of 0.2 for "awesome", etc.). In accordance with one aspect, the relevancy scores are normalized to fall in interval [0, 1].

In accordance with some aspects, one or more of the subjective attributes identified at block 403 may be discarded at block 404 based on their relevancy scores (e.g., retain the k subjective attributes with the highest relevancy scores, discard any subjective attribute whose relevancy score is below a threshold, etc.). It should be noted that in some aspects, a subjective attribute may be discarded by setting its relevancy score to zero. In one implementation, block 404 is performed by relevancy scorer 204.

At block 405, the subjective attributes and relevancy scores obtained at blocks 403 and 404 are associated with the entities (e.g., via tagging, via entries in a table in a relational database, etc.). At block 406, a feature vector for entity E is obtained. In one aspect, the feature vector for a video clip or still image may contain numerical values pertaining to color, texture, intensity, etc., while the feature vector for an audio clip (or a video clip with sound) may include numerical values pertaining to amplitude, spectral coefficients, etc., while the feature vector for a text document may include numerical values pertaining to word frequencies, average sentence length, formatting parameters, and so forth. In accordance with one implementation, block 406 is performed by feature extractor 206.

At block 407, the feature vector obtained at block 406 and the relevancy scores obtained at block 404 are added to the training set. Block 408 checks whether the set S of entities is empty; if S is non-empty, execution continues back at block 402, otherwise execution proceeds to block 409.

At block 409, the classifier is trained on all of the examples of the training set, such that the feature vector of a training example is provided as input to the classifier, and the subjective attribute relevancy scores are provided as output.

Figure 5:
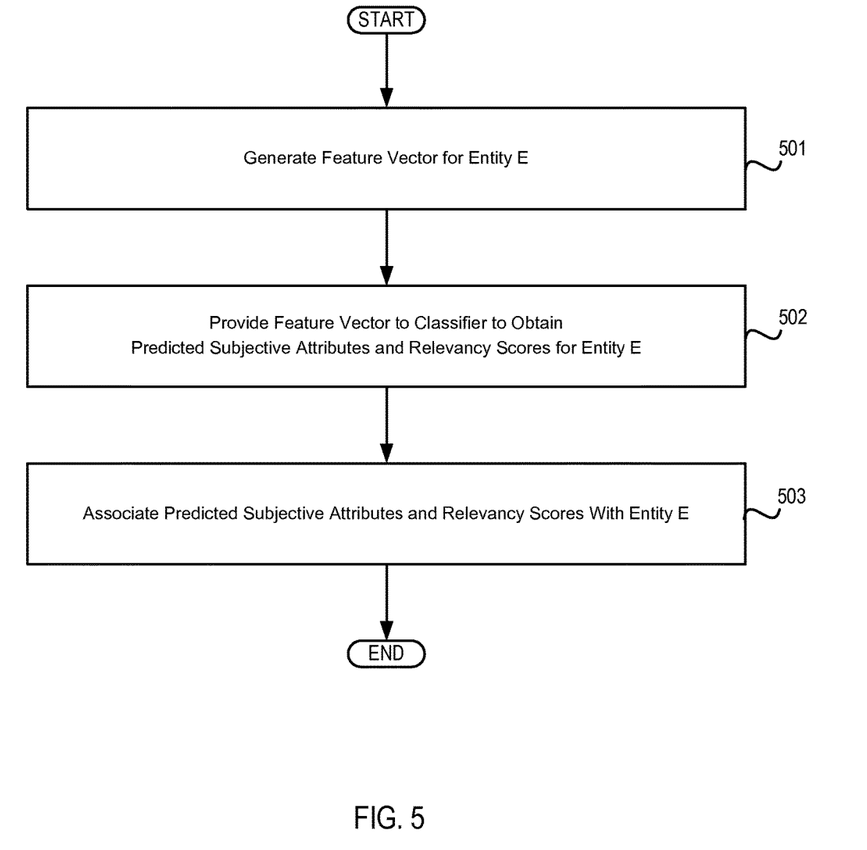
FIG. 5 depicts a flow diagram of an example of a first method for obtaining subjective attributes and relevancy scores for an entity, in accordance with some implementations of the present disclosure.

FIG. 5 depicts a flow diagram of an example of a first method for obtaining subjective attributes and relevancy scores for an entity, in accordance with some implementations of the present disclosure. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more of blocks 501 through 503 may be performed by another machine.

At block 501, a feature vector for entity E is generated. As described above, the feature vector for a video clip or still image may contain numerical values pertaining to color, texture, intensity, etc., while the feature vector for an audio clip (or a video clip with sound) may include numerical values pertaining to amplitude, spectral coefficients, etc., while the feature vector for a text document may include numerical values pertaining to word frequencies, average sentence length, formatting parameters, and so forth. In accordance with one implementation, block 501 is performed by feature extractor 206.

At block 502, the feature vector is provided to the trained classifier to obtain predicted subjective attributes and relevancy scores for entity E. At block 503, the predicted subjective attributes and relevancy scores are associated with entity E (e.g., via tags applied to entity E, via entries in a table of a relational database, etc.).

Figure 6:
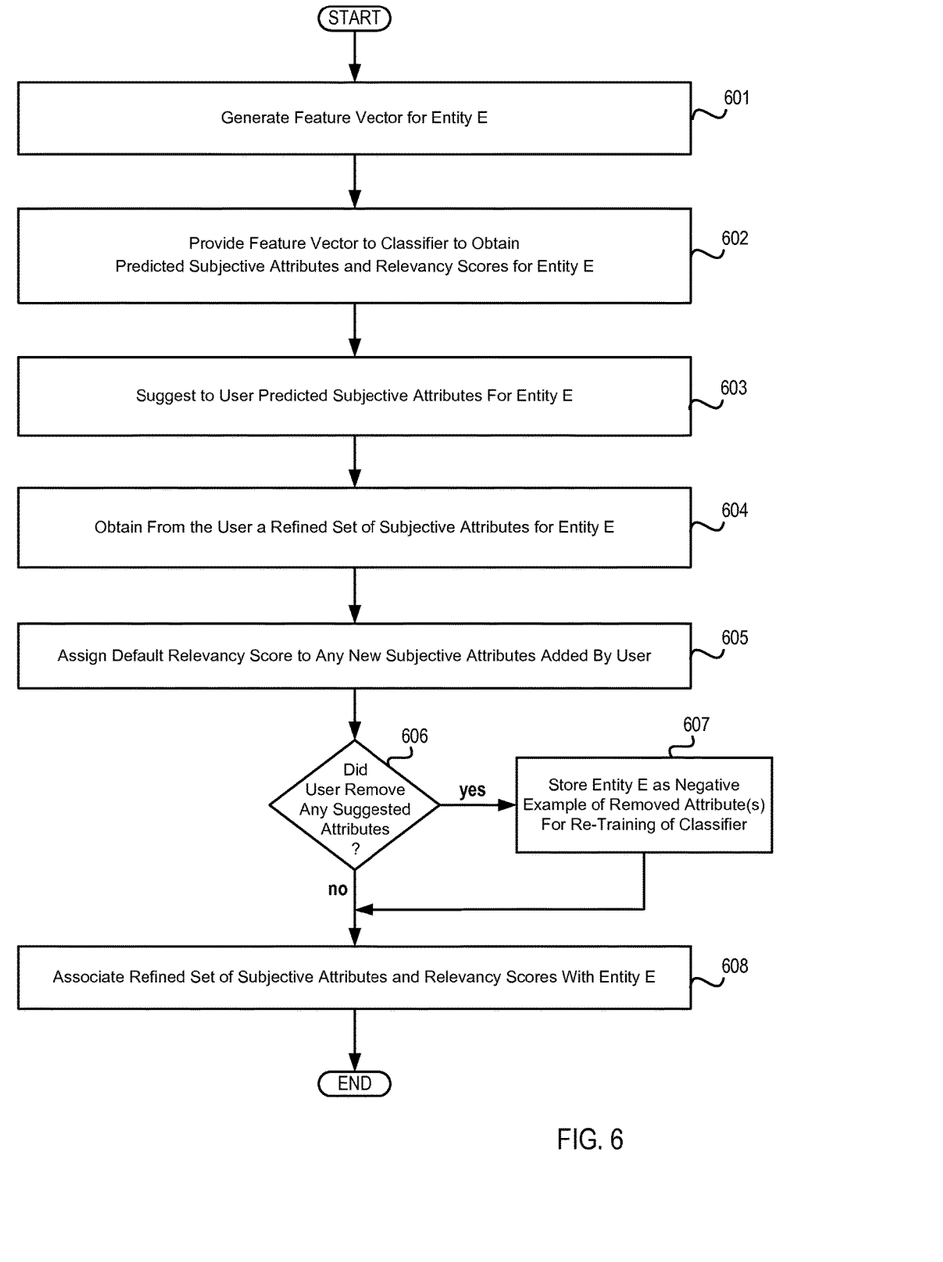
FIG. 6 depicts a flow diagram of an example of a second method for obtaining subjective attributes and relevancy scores for an entity, in accordance with some implementations of the present disclosure.

FIG. 6 depicts a flow diagram of an example of a second method for obtaining subjective attributes and relevancy scores for an entity, in accordance with some implementations of the present disclosure. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more of blocks 601 through 608 may be performed by another machine.

At block 601, a feature vector for entity E is generated, as in block 501 of FIG. 5. At block 602, the feature vector is provided to the trained classifier to obtain predicted subjective attributes and relevancy scores for entity E, as in block 502 of FIG. 5.

At block 603, the predicted subjective attributes obtained at block 602 are suggested to a user (e.g., the user who uploaded the entity, etc.), and at block 604, a refined set of subjective attributes is obtained from the user (e.g., via a web page in which the user selects from among the suggested attributes and possibly adds new attributes, etc.). At block 605, a default relevancy score is assigned to any new subjective attributes that were added by the user at block 604. In some implementations, the default relevancy score may be 1.0 on a scale from 0.0 to 1.0, while in some other implementations, the default relevancy score may be based on the particular user (e.g., a score of 1.0 when the user is known from past history to be very good at suggesting attributes, a score of 0.8 when the user is known to be somewhat good at suggesting attributes, etc.).

Block 606 branches based on whether the user removed any of the suggested subjective attributes (e.g., by not selecting the attribute at block 604, etc.). If so, execution proceeds to block 607, otherwise execution continues at block 608.

At block 607, entity E is stored as a negative example of the removed attribute(s) for future re-training of the classifier. At block 608, the refined set of subjective attributes and corresponding relevancy scores are associated with entity E (e.g., via tags applied to entity E, via entries in a table of a relational database, etc.).

Figure 7:
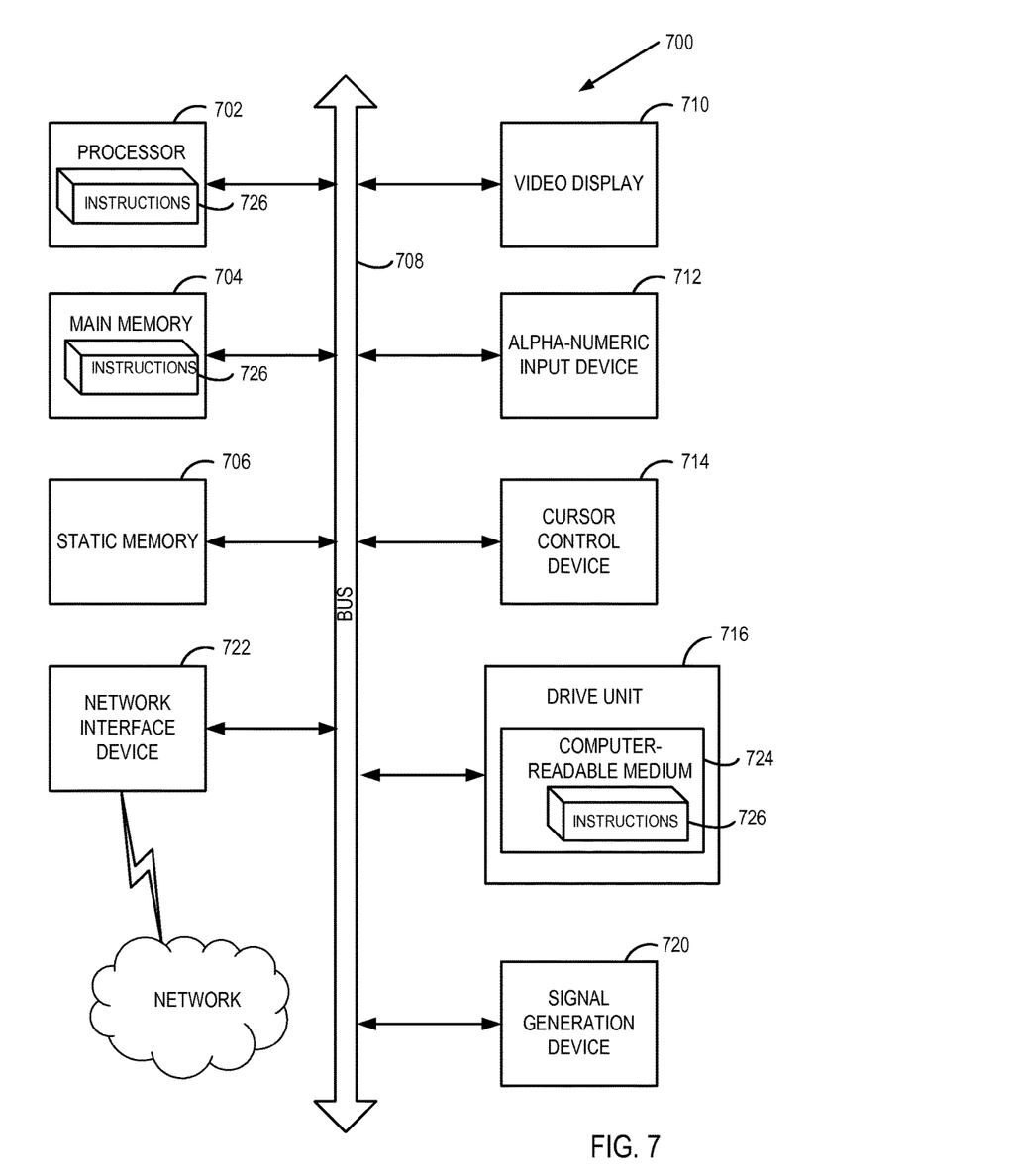
FIG. 7 depicts a block diagram of an illustrative computer system operating in accordance with aspects and implementations of the present disclosure.

FIG. 7 illustrates an exemplary computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a tablet computer, a mobile device, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions 726 (e.g., instructions executed by subjective attribute manager 125 and corresponding to blocks of FIGS. 3 through 6, etc.) embodying any one or more of the methodologies or functions described herein. Instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that aspects and implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "obtaining," "providing," "receiving," "training," "associating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" or "an implementation" or "one implementation" throughout is not intended to mean the same aspect or implementation unless described as such.

It is to be understood that the above description is intended to be illustrative, and not restrictive. Many other aspects and implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a computer system, a plurality of subjective attributes for a first entity based on terms from a plurality of user reactions to the first entity, wherein the terms are not a user-supplied tag;
   determining respective relevancy scores for the plurality of subjective attributes with respect to the first entity using at least a number of occurrences of a plurality of users bookmarking the first entity;
   obtaining a first set of features for the first entity; and
   training a classifier on a set of input-output mappings, wherein the set of input-output mappings comprises an input-output mapping whose input is based on the first set of features and whose output is based on the respective relevancy scores for the plurality of subjective attributes with respect to the first entity, wherein the trained classifier is to be applied to a second set of features of a second entity to obtain respective relevancy scores for one or more subjective attributes with respect to the second entity.

2. The method of claim 1 wherein the determining of the plurality of subjective attributes for the first entity is further based on a plurality of users sharing the first entity.

3. The method of claim 1 wherein the determining of the plurality of subjective attributes for the first entity is further based on a plurality of users adding the first entity to respective playlists.

4. The method of claim 1 wherein the first entity is a media clip.

5. The method of claim 1 wherein the respective relevancy score for a subjective attribute is based on a number of times that the subjective attribute appears in a set of comments pertaining to the first entity.

6. The method of claim 1 wherein the respective relevancy score for a subjective attribute is based on a number of comments pertaining to the first entity.

7. An apparatus comprising:
a memory to store:
one or both of a first entity and a datum associated with the first entity, and
one or both of a second entity and a datum associated with the second entity; and
a processor, operatively coupled to the memory, to:
determine a plurality of subjective attributes for a first entity based on terms from a plurality of user reactions to the first entity, wherein the terms are not a user-supplied tag;
determine respective relevancy scores for the plurality of subjective attributes with respect to the first entity using at least a number of occurrences of a plurality of users bookmarking the first entity;
obtain a first set of features for the first entity; and
train a classifier on a set of input-output mappings, wherein the set of input-output mappings comprises an input-output mapping whose input is based on the first set of features and whose output is based on the respective relevancy scores for the plurality of subjective attributes with respect to the first entity, wherein the trained classifier is to be applied to a second set of features of a second entity to obtain respective relevancy scores for one or more subjective attributes with respect to the second entity.

8. The apparatus of claim 7 wherein the determining is further based on a plurality of users adding the first entity to respective playlists.

9. The apparatus of claim 7 wherein the first entity is a person or an organization.

10. The apparatus of claim 7 wherein the processor is further to provide a suggestion that suggests one or more subjective attributes for a third entity.

11. The apparatus of claim 10 wherein the processor is further to re-train the classifier based on a response to the suggestion.

12. A non-transitory computer-readable storage medium having instructions stored therein, which when executed, cause a computer system to perform operations comprising:

determining a plurality of subjective attributes for a first entity based on terms from a plurality of user reactions to the first entity, wherein the terms are not a user-supplied tag;

determining respective relevancy scores for the plurality of subjective attributes with respect to the first entity using at least a number of occurrences of a plurality of users bookmarking the first entity;

obtaining a first set of features for the first entity; and training a classifier on a set of input-output mappings, wherein the set of input-output mappings comprises an input-output mapping whose input is based on the first set of features and whose output is based on the respective relevancy scores for the plurality of subjective attributes with respect to the first entity, wherein the trained classifier is to be applied to a second set of features of a second entity to obtain respective relevancy scores for one or more subjective attributes with respect to the second entity.

13. The non-transitory computer-readable storage medium of claim 12 wherein the first entity is a blog entry.

14. The non-transitory computer-readable storage medium of claim 12 wherein the operations further comprise obtaining the data pertaining to the one or more users bookmarking the one or more entities.

15. The non-transitory computer-readable storage medium of claim 14 wherein the set of input-output mappings comprises data pertaining to a source of a comment that mentions the subjective attribute with respect to the first entity.

16. The non-transitory computer-readable storage medium of claim 12 wherein the operations further comprise selecting subjective attributes with the highest relevancy scores.

17. The non-transitory computer-readable storage medium of claim 12 wherein the operations further comprise applying a threshold to the respective relevancy scores.

* * * * *